(12) United States Patent
Sugaya et al.

(10) Patent No.: US 7,180,654 B2
(45) Date of Patent: Feb. 20, 2007

(54) RAMAN AMPLIFIER

(75) Inventors: Yasushi Sugaya, Kawasaki (JP); Shinichirou Muro, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 10/622,580

(22) Filed: Jul. 21, 2003

(65) Prior Publication Data

US 2004/0080812 A1   Apr. 29, 2004

(30) Foreign Application Priority Data

Jul. 25, 2002   (JP) .............................. 2002-216947

(51) Int. Cl.
*H01S 3/00* (2006.01)
(52) U.S. Cl. ............. 359/334; 359/341.33; 359/341.41
(58) Field of Classification Search ................ 359/334, 359/341.33, 341.41
See application file for complete search history.

(56) References Cited

U.S. PATENT DOCUMENTS

| | | | | |
|---|---|---|---|---|
| 5,966,236 | A * | 10/1999 | Okuno ........................ | 359/337 |
| 6,522,796 | B1 * | 2/2003 | Ziari et al. ...................... | 385/11 |
| 6,611,368 | B1 | 8/2003 | Grant et al. ................. | 359/334 |
| 6,775,055 | B2 * | 8/2004 | Tsuzaki et al. ............. | 359/334 |
| 6,823,107 | B2 | 11/2004 | Muro et al. .................... | 385/27 |
| 6,943,937 | B2 * | 9/2005 | Lelic et al. ............ | 359/337.11 |
| 2002/0024721 | A1 | 2/2002 | Tsuzaki et al. ............. | 359/334 |

FOREIGN PATENT DOCUMENTS

| | | |
|---|---|---|
| CN | 1334484 | 7/2001 |
| EP | 1 018 666 | 7/2000 |
| JP | 2001-127711 | 5/2001 |
| JP | 2002-6349 | 1/2002 |
| JP | 2003-110179 | 4/2003 |

OTHER PUBLICATIONS

Search Report for corresponding European Appln. No. EP 03 01 6532 dated Aug. 3, 2005.
China Patent Office Action issued Jul. 28, 2006 for Chinese Patent Application No. 03149815.9.

* cited by examiner

*Primary Examiner*—Jack Keith
(74) *Attorney, Agent, or Firm*—Staas & Halsey LLP

(57) ABSTRACT

Multi-wavelength light, including a plurality of segments of light signal with a different wavelength each, is inputted into a Raman amplification fiber. Pumping light generated by a pumping light source is supplied to the Raman amplification fiber in the opposite direction of the transmission direction of the multi-wavelength light. An auxiliary light source generates auxiliary light. An auxiliary light control circuit adjusts the optical power of the auxiliary light with a prescribed response time, based on the change in input power of the multi-wavelength light. The auxiliary light is supplied to the Raman amplification fiber in the same direction as the transmission direction of the multi-wavelength light.

19 Claims, 17 Drawing Sheets

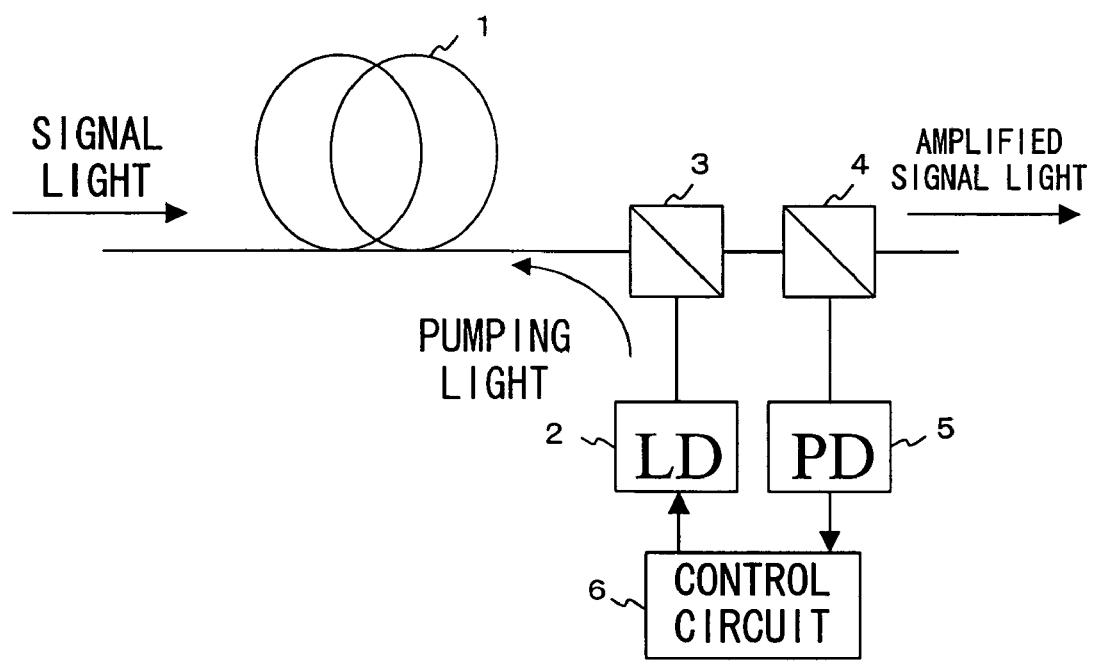
F I G. 4

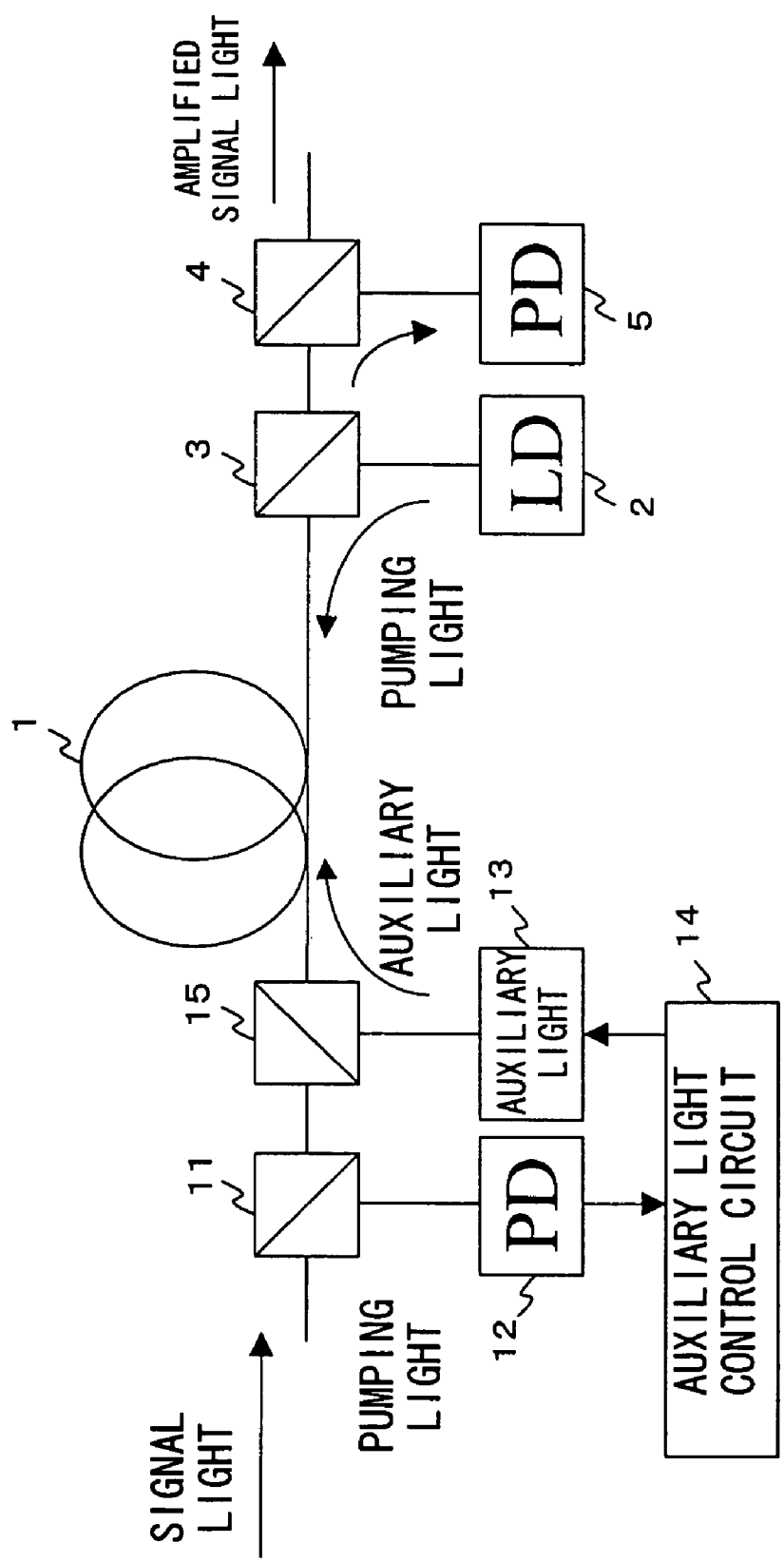
F I G. 5

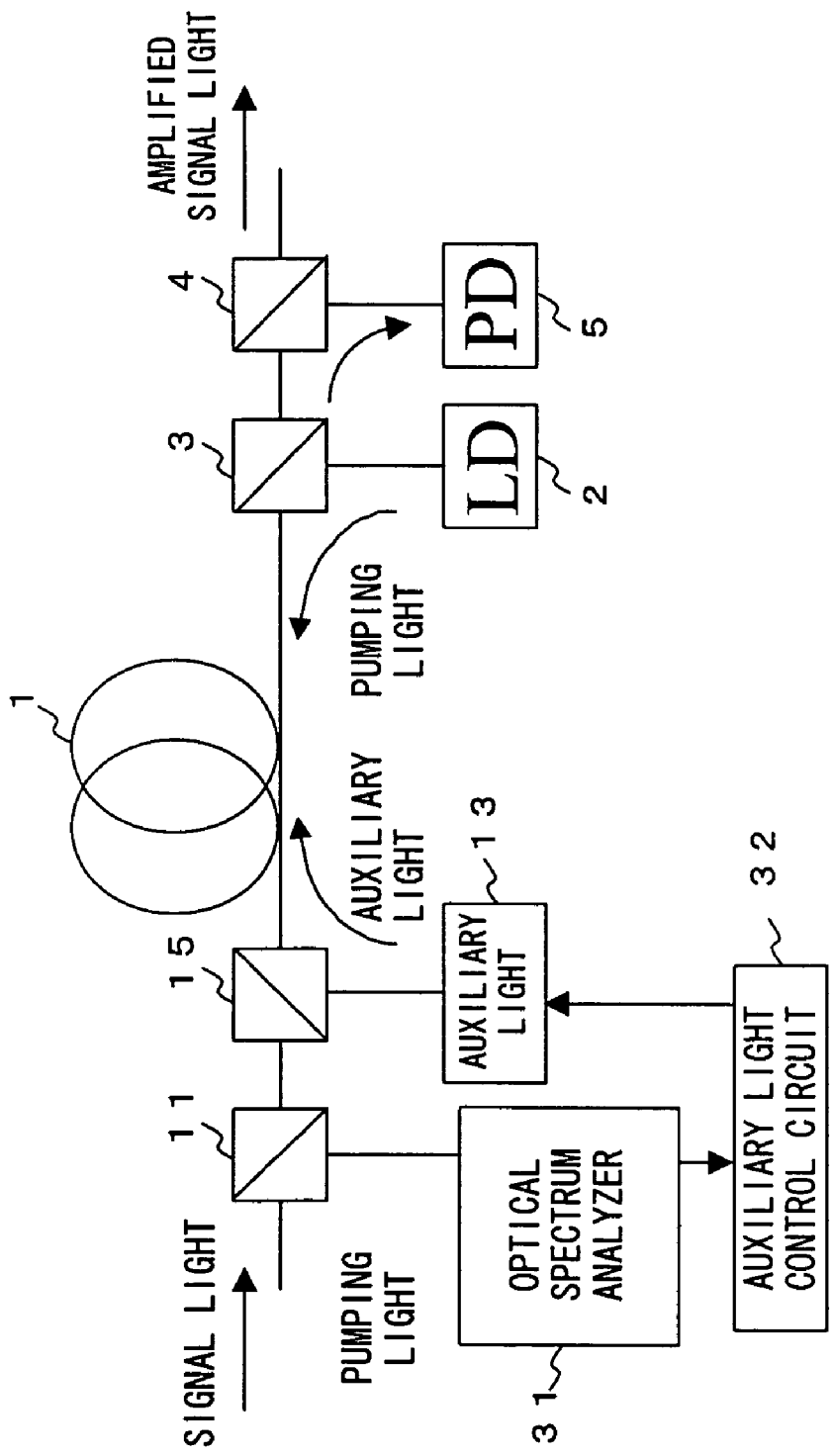
F I G. 12

| ARRANGEMENT OF SIGNAL LIGHT | LEVEL OF AUXILIARY LIGHT |
|---|---|
| 1 1 1 1 1 1 1 | $A_0$ |
| 0 1 1 1 1 1 1 | $A_1$ |
| 1 0 1 1 1 1 1 | $A_2$ |
| 1 1 0 1 1 1 1 | $A_3$ |
| 1 1 1 0 1 1 1 | $A_4$ |
| 1 1 1 1 0 1 1 | $A_5$ |
| 1 1 1 1 1 0 1 | $A_6$ |
| 1 1 1 1 1 1 0 | $A_7$ |
| 1 1 1 1 1 1 0 | $A_8$ |
| ⋮ | ⋮ |

FIG. 14

RAMAN AMPLIFIER

BACKGROUND OF THE INVENTION

1. Field of the Invention

The present invention relates to a Raman optical amplifier, and in particular, relates to a feed forward control type Raman optical amplifier.

2. Description of the Related Art

Recently, in trunk optical transmission systems, a large-capacity transmission system adopting a wavelength division multiplex (WDM) transmission technology has become widespread. A Raman optical amplifier is one of the key devices that support such a large-capacity WDM transmission system.

FIG. 1 shows the basic configuration of a general Raman optical amplifier. In FIG. 1, a backward pumping type Raman optical amplifier in which pumping light is supplied in the direction the reverse of the transmission direction of signal light is shown.

A Raman amplification fiber 1 amplifies input signal light using pumping light generated by a pumping light source 2. This input light is multi-wavelength light or WDM light obtained by multiplexing a plurality of segments of signal light with a different wavelength each. For the pumping light source (LD) 2, a laser diode and the like is used, and the pumping light source 2 generates pumping light with a wavelength shorter than that of the signal light. A WDM coupler 3 is an optical device for multiplexing the signal light and the pumping light generated by the pumping light source 2, and guides the pumping light to the Raman amplification fiber 1. Then, the signal light inputted through the input port is amplified by the Raman amplification fiber 1 and is guided to an output port through the WDM coupler 3.

The operation area of the Raman optical amplifier is mainly the gain-unsaturated area, while generally the operation area of an erbium-doped fiber amplifier (EDFA), which is the most popular in today's optical transmission systems spreads across the gain-unsaturated area and gain-saturated area. In the gain-unsaturated area, if pumping light power is constant, gain is always constant even if the input level of signal light changes. However, in the gain-saturated area, even if pumping light power is constant, gain varies with the input level of signal light. On the other hand, recently, with the advent of a broader-band and higher-power optical communication system, the extension of the operation area (change range of the input level of signal light) has been demanded. As a result, the use of the gain-saturated area in a Raman optical amplifier has been promoted.

If a plurality of segments of signal light is inputted and the total power of the plurality of segments of signal light in the Raman amplification fiber 1 becomes sufficiently high or the band of the signal light becomes broader, power tilt (or power deviation) increases and becomes no more negligible due to inter-signal-light Raman effect (inter-signal-light Raman scattering). Here, "Inter-signal-light Raman effect" is a phenomenon in which signal light with a longer wavelength is amplified by signal light with a shorter wavelength. In this case, signal light with a shorter wavelength works as pumping light for signal light with a longer wavelength. Power tilt means that the output level of each segment of signal light is not flat against wavelength.

In this case, if a Raman optical amplifier is used in a gain-saturated area or the optical power of input signal light is high, the output power of the signal light varies as the input power of multi-wavelength light fluctuates due to the increase/decrease of the number of wavelengths to be multiplexed, even if pumping power is constant. Therefore, in a transmission system presuming that the number of wavelength (or number of channels) increases or decreases during operation, there is the possibility that transmission quality (S/N, etc.) temporarily degrades when the number of wavelengths increases/decreases, unless such gain fluctuations are taken into consideration as design margin or measures are taken to cope with such gain fluctuations in designing.

Pumping light is usually supplied backward to the Raman amplification fiber 1 in order to avoid the degradation of transmission quality due to the polarization-dependence of the gain of signal light, pumping light noise transfer to a signal, cross gain modulation between signals through pumping light and the like. However, in the amplifying operation by backward pumping, there is a transient response characteristic, which depends on the length of the Raman amplification fiber 1, unlike in the case of forward pumping.

FIGS. 2A and 2B show the output power response waveforms of a Raman optical amplifier. In FIGS. 2A and 2B, the output power of other channels obtained when a prescribed channel of multi-wavelength light in which a plurality of signal channels with a different wavelength each is added/deleted (or stop) being used. It is assumed that a channel that is added/deleted is called "ON/OFF channel", and the other channels are called "remaining channels". It is also assumed that pumping power is constant. Furthermore, it is assumed that this Raman optical amplifier is used in a gain-saturated area.

If an ON/OFF channel is deleted when a Raman optical amplifier is used in the gain-saturated area, the saturation level becomes low and the gain becomes high. Therefore, the output power of the remaining channels increases. In FIGS. 2A and 2B, an ON/OFF channel is deleted at time T=50 μs.

In the case of backward pumping, as shown in FIG. 2A, the fluctuations in output power of the remaining channels that are caused due to the addition/deletion (or the stoppage) of use of the ON/OFF channel takes a prescribed response time. This response time depends on the length of the Raman amplification fiber 1 and is approximately twice as long as the fiber propagation time of signal light or pumping light. However, as shown in FIG. 2B, in the case of forward pumping, the output power of the remaining channels fluctuates in a very short time.

FIGS. 3A and 3B show the output power response waveforms of a Raman optical amplifier obtained when inter-signal-light Raman effect occurs. In FIGS. 3A and 3B, the fluctuations in output power of the remaining channels that are caused when an ON/OFF channel is added are shown. Here, it is assumed that pumping power is constant.

In this case, if an ON/OFF channel is added, the output power of the remaining channels varies by two steps of fluctuation speed. Here, the waveform of the output power of the remaining channels varies depending on the wavelength of the ON/OFF channel to be added. For example, if the wavelength of the ON/OFF channel is shorter than that of the remaining channels, as shown in FIG. 3A, the output power of the remaining channels increases rapidly and then varies with a prescribed response time, when that ON/OFF channel is added. However, if the wavelength of the ON/OFF channel is longer than that of the remaining channels, as shown in FIG. 3B, the output power of the remaining channels falls rapidly and then varies with a prescribed response time, when that ON/OFF channel is added. Similarly, the output power of the remaining channels varies by two steps of fluctuation speed, when an ON/OFF channel is deleted.

As described above, in a WDM transmission system assuming that the number of channels is changed during operation, the optical level of the remaining channels fluctuates every time a channel is added/deleted. Furthermore, if the wavelength of a channel to be added/deleted is different, the optical power of the remaining channels varies depending on the wavelength. For this reason, in such a transmission system, it is not easy to manage the transmission characteristic of signal light.

As a method for solving the problem described above, a method of maintaining the gain of a Raman optical amplifier constant by dynamically controlling pumping light is known.

FIG. 4 shows the configuration of a Raman optical amplifier with a function to dynamically control pumping light. In this configuration, the Raman amplifier fiber 1, the pumping light source 2 and the WDM coupler 3 has been already described in FIG. 1.

An optical coupler 4 splits part of the signal light amplified by the Raman amplification fiber 1 and guides it to a photo-receiving device (PD: Photo Diode) 5. The photo-receiving device 5, which can be realized by a photo diode or the like, generates an electrical signal indicating the optical power of the signal light split by the optical coupler 4. A control circuit 6 monitors the optical power of signal light that is amplified by the Raman amplification fiber 1 based on the output of the photo-receiving device 5. Then, the control circuit 6 controls the output power of the pumping light source 2 in such a way that the output power of the signal light may be maintained constant.

As described above, in the Raman optical amplifier shown in FIG. 4 maintains the output power of signal light constant by performing feedback control using information indicating optical output power as a feedback signal. However, there is a limit to the improvement in speed of a feedback system. Therefore, the Raman optical amplifier shown in FIG. 4 has also the following problems.

(1) If an ON/OFF channel is added/deleted in a situation where Raman amplification between signal lights is not negligible, as shown in FIGS. 3A and 3B, the output power of the remaining channels promptly varies. Therefore, control by a feedback system cannot catch up with the variation. Thus, it is practically impossible to suppress the level fluctuations of the remaining channels due to Raman amplification between signal lights by feedback control.

(2) As described in FIGS. 2A and 2B, the output response characteristic of a backward pumping type Raman optical amplifier depends on the length of a Raman amplifier fiber. For this reason, the improvement in speed of the feedback system may disturb the control (there is oscillation, etc.) due to the setting error of a time constant, if flexibility in the design of the feedback system (gain, response time, etc.) is attempted taking a replace of a Raman amplification fiber with another into consideration.

(3) If a plurality of pieces of pumping light with a different wavelength each is supplied, high-speed feedback control must be performed taking into consideration the power balance between the plurality of pieces of pumping light. Therefore, a complex control algorithm is needed.

(4) Since Raman effective length is pretty long, an amplification response time is subject to a fiber propagation time. In particular, in the case of forward pumping, there is a control delay due to the propagation time.

As described above, in the conventional Raman optical amplifier, if the number of the wavelengths of multi-wavelength light changes when the multi-wavelength light is amplified, it is difficult to suppress the fluctuations in optical level of each segment of signal light included in the multi-wavelength light. In particular, when a Raman optical amplifier is used in gain-saturated area or when Raman amplification induced power tilt is not negligible between signal lights, it is very difficult to suppress the fluctuations.

SUMMARY OF THE INVENTION

It is an object of the present invention to realize a Raman optical amplifier suppressing the fluctuations in optical level of each segment of signal light included in multi-wavelength light to be amplified, even when the number of wavelengths of the multi-wavelength light changes.

A Raman optical amplifier according to the present invention comprises an optical amplification medium into which multi-wavelength light is inputted, a pumping light source supplying pumping light to the optical amplification medium, an auxiliary light source generating auxiliary light with a shorter wavelength than a center wavelength of the multi-wavelength light, an optical device guiding the auxiliary light to the optical amplification medium in the same direction as that of the multi-wavelength light and an auxiliary light controller controlling the optical power of the auxiliary light based on the input power of the multi-wavelength light.

When the input power of multi-wavelength light changes, the gain of the optical amplification medium varies depending on the operation state of the Raman optical amplifier and accordingly the output power varies. Therefore, the Raman optical amplifier of the present invention is provided with an auxiliary light source supplying auxiliary light to the optical amplification medium. In this case, by controlling the optical power of the auxiliary light based on the input power of multi-wavelength light, the gain of the optical amplification medium can be prevented from changing. Therefore, even when the input power of multi-wavelength light changes, the fluctuations of the output power is suppressed.

In particular, in the case of backward pumping, after the input power of multi-wavelength light has changed, the output power varies with a prescribed response time corresponding to the propagation time of a signal in the optical amplification medium. Therefore, by controlling the optical power of auxiliary light in such a way as to change with a prescribed response time corresponding to the signal propagation time of the optical amplification medium, the fluctuations of the optical output power can be appropriately suppressed. In this case, for example, if the input power of the multi-wavelength light changes from the first input level to the second input level, the auxiliary light controller may make the optical power of the auxiliary light change with a response time that is determined based on the propagation time of the multi-wavelength light or the pumping light in the optical amplification medium, from the first steady state corresponding to the first input level to the second steady state corresponding to the second input level.

The Raman optical amplifier in another aspect of the present invention further comprises a detector detecting the wavelength arrangement of a plurality of segments of signal light included in the multi-wavelength light and an auxiliary light controller controlling the optical power of auxiliary light based on the change of the wavelength arrangement of signal light that is detected by the detector, in addition to the optical amplification medium, pumping light source, auxiliary light source and optical device that are described above. According to this configuration, since the optical power of the auxiliary light is controlled based on the wavelength of an added or deleted signal, the fluctuations of the output power can be further suppressed.

The Raman optical amplifier in another aspect of the present invention assumes the use in an optical transmission system in which state information indicating the state of signal light in multi-wavelength light is informed to an amplification node on a transmission line. In this case, the Raman optical amplifier further comprises an auxiliary light controller controlling the optical power of auxiliary light based on the state information, in addition to the optical amplification medium, pumping light source, auxiliary light source and optical device that are described above. According to this configuration, the optical power of auxiliary light can be controlled based on the wavelength of an added or deleted signal without a detector for detecting the wavelength arrangement of a plurality of segments of signal light included in multi-wavelength light.

BRIEF DESCRIPTION OF THE DRAWINGS

FIG. 4 shows the configuration of a Raman optical amplifier with a function to dynamically control pumping light;

FIG. 5 shows the configuration of the Raman optical amplifier in the embodiment of the present invention;

FIG. 12 shows the configuration of another embodiment of the present invention;

FIG. 14 shows an example of a management table managing the setting values of the optical power of auxiliary light corresponding to each state of multi-wavelength light;

DESCRIPTION OF THE PREFERRED EMBODIMENTS

The embodiments of the present invention are described below with reference to the drawings.

FIG. 5 shows the configuration of the Raman optical amplifier in the embodiment of the present invention. The Raman optical amplifier amplifies light within a frequency area located a prescribed frequency away from the frequency of supplied pumping light. Specifically, the Raman optical amplifier can collectively amplify a plurality of segments of light within a prescribed wavelength range. The Raman optical amplifier of the embodiment collectively amplifies multi-wavelength light in which a plurality of segments of signal light with a different wavelength each are multiplexed.

Figure 1:
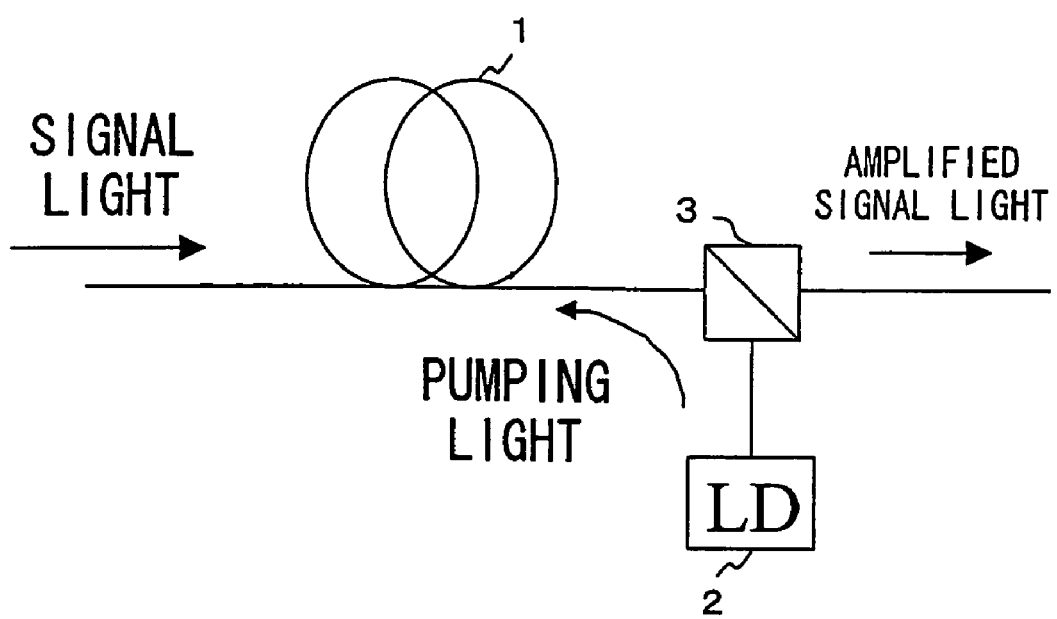
FIG. 1 shows the basic configuration of a general Raman optical amplifier.
Figure 2A:
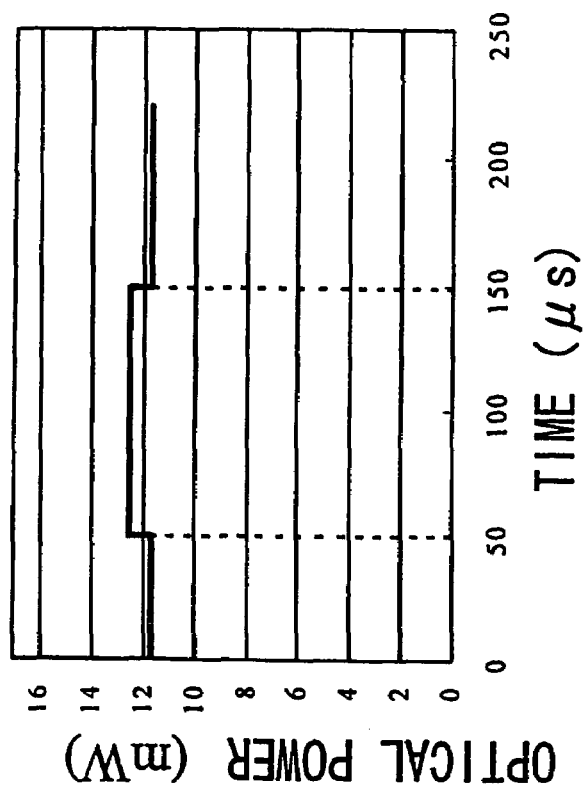
FIGS. 2A and 2B show the output response wavelengths of the Raman optical amplifier.
Figure 2B:
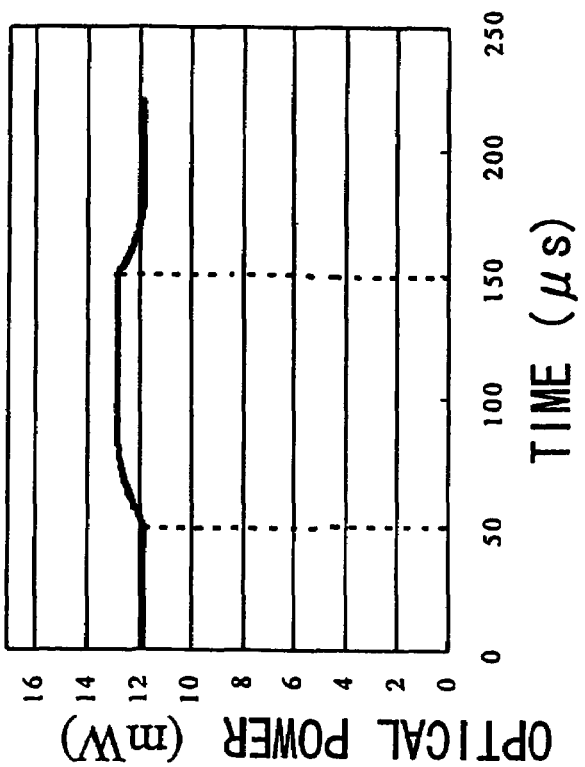
Figure 3A:
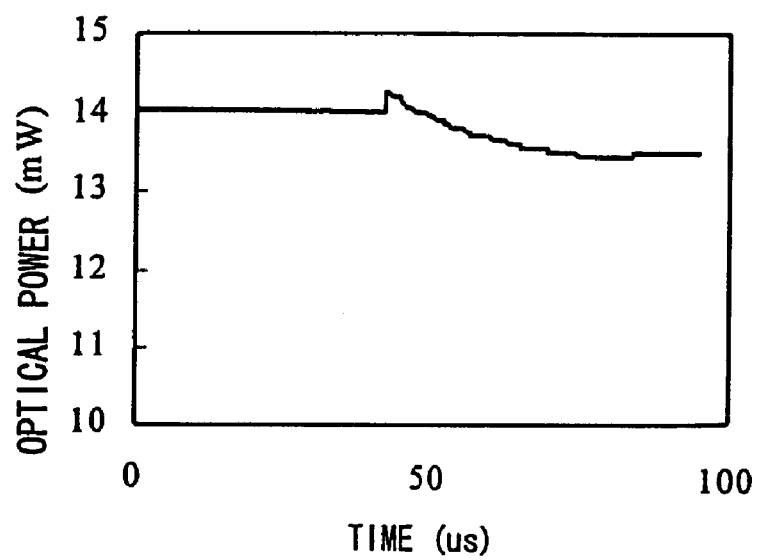
FIGS. 3A and 3B show the output response wavelengths of the Raman optical amplifier obtained when there is inter-signal light Raman amplification.
Figure 3B:
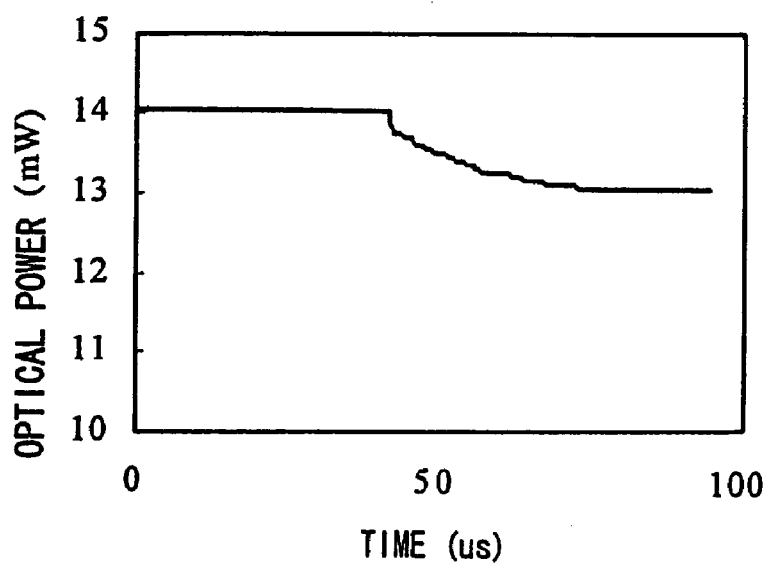

In FIG. 5, the Raman amplification fiber 1, the pumping light source (LD) 2, the WDM coupler 3, the optical coupler 4 and the photo receiving device (PD) 5 are already described in FIGS. 1 and 4. The Raman amplification fiber 1 can be realized, for example, by a general transmission fiber or a dispersion compensation fiber, and is used as an optical amplification medium. The pumping light source 2 can be realized by a single laser diode generating pumping light with a prescribed wavelength. Alternatively, it can be realized by a plurality of laser diodes generating a plurality of pieces of pumping light with a different wavelength each. Furthermore, although in the embodiment shown in FIG. 5, the optical power of pumping light to be generated by the pumping light source 2 is fixed, the present invention does not negate a configuration in which the optical power of pumping light is dynamically controlled (for example, feedback control).

An optical coupler 11 splits part of input light and guides it to a photo receiving device (PD) 12. Here, this input light is multi-wavelength light in which a plurality of segments of signal light with a different wavelength each are multiplexed. The photo receiving device 12, which can be a photo-diode or the like, generates electric signals indicating the optical power of the multi-wavelength light split by the optical coupler 11. Here, the splitting ratio of the optical coupler 11 is fixed. Therefore, the total optical power of multi-wavelength light to be inputted can be detected by monitoring the signal from the photo receiving device 12.

Figure 6:
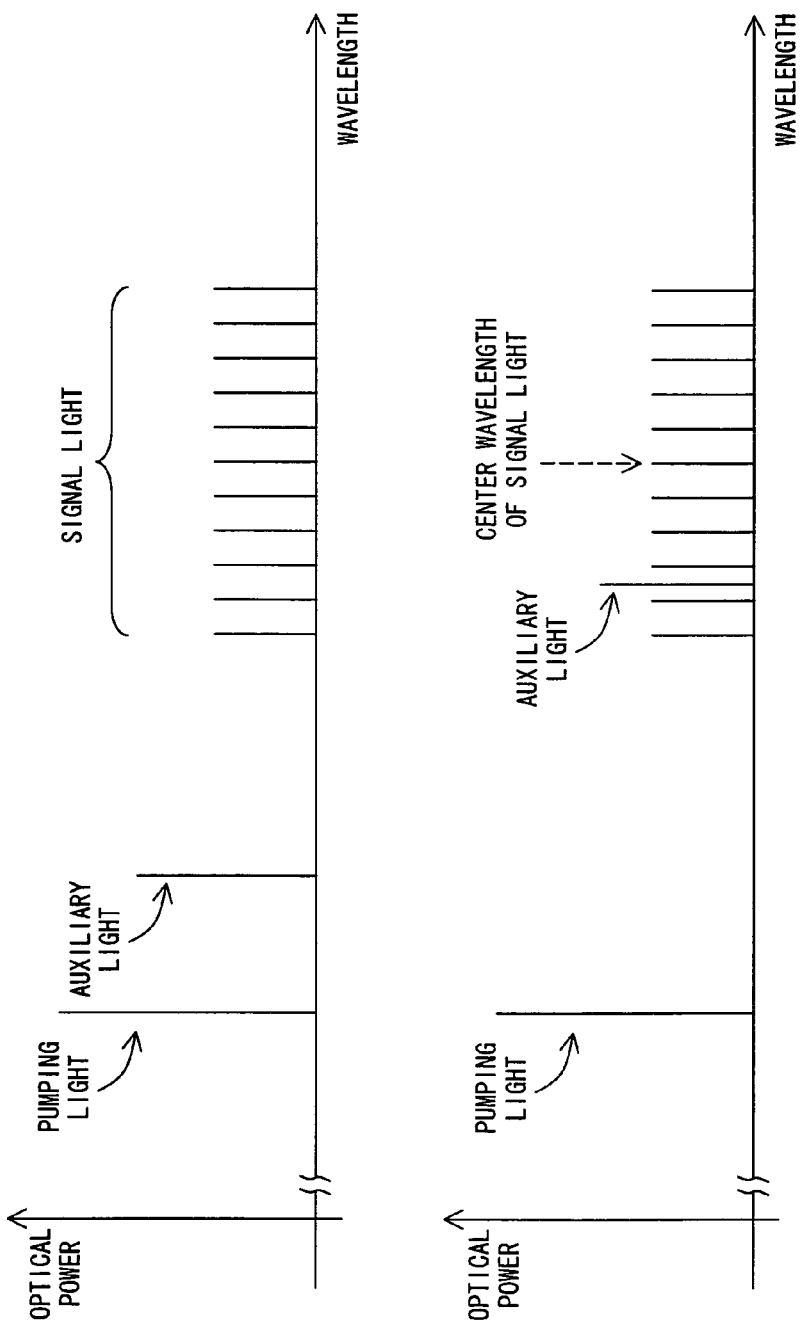
FIGS. 6A and 6B shows the arrangement of signal light and auxiliary light.

An auxiliary light source 13, which can be realized by a laser diode or the like, generates auxiliary light with a prescribed wavelength. It is preferable for the wavelength of this auxiliary light to be shorter than the center wavelength (or weighted average wavelength) of a plurality of segments of signal light. In this case, as shown in FIG. 6A, for the wavelength of the auxiliary light, a shorter wavelength than that of any segment of signal light can be used. Alternatively, as shown in FIG. 6B, a wavelength in the wavelength area for signal light can be used for it. If such a wavelength is used, auxiliary light can work as pumping light for the signal light. Alternatively, the wavelength of auxiliary light can be the same as that of pumping light generated by the pumping light source 2. It is preferable for the relative intensity noise (RIN) of auxiliary light to be a value such that it does not affect the noise characteristic of multi-wavelength light outputted from this Raman optical amplifier. Specifically, it is preferable for the RIN to be, for example, −130 dB/Hz or less.

An auxiliary light control circuit 14 monitors the optical power of input multi-wavelength light, based on the electric signal outputted from the receiving optical device 12. The auxiliary light control circuit 14 controls the optical power of the auxiliary light, based on the input power of the multi-wavelength light. Specifically, the auxiliary light control circuit 14 change the optical power of the auxiliary light with a prescribed response time, based on the variation in input power of the multi-wavelength light. In this case, the optical power of the auxiliary light is controlled by, for example, a driving current used to drive the auxiliary light source 13. The configuration and operation of the auxiliary light control circuit 14 is described in detail later.

A WDM coupler 15 guides multi-wavelength light to the Raman amplification fiber 1 and also guides the auxiliary light generated by the auxiliary light source 13 to the Raman amplification fiber 1. Specifically, the WDM coupler 15 multiplexes the multi-wavelength light and the auxiliary light and guide them. Therefore, the auxiliary light is supplied to the Raman amplification fiber 1 to be propagated in the same direction as the multi-wavelength light.

An input unit including the optical coupler 11, the photo receiving device 12, the auxiliary light source 13, the auxiliary light control circuit 14 and the WDM coupler and an output unit including the pumping light source 2, the WDM coupler 3, the optical coupler 4 and the photo receiving device 5 may be located closely each other or may be located far away each other.

In this Raman optical amplifier, the Raman amplification fiber 1 is pumped by the pumping light, and the input multi-wavelength light (a plurality of segments of signal light) is amplified in the Raman amplification fiber 1. In addition, the auxiliary light is supplied to the Raman amplification fiber 1. Here, the optical power of the auxiliary light is adjusted by the auxiliary light control circuit 14 according to the variation of the input power of the multi-wavelength light. Specifically, when the input power of the multi-wavelength light changes due to the addition or deletion of a channel in the multi-wavelength light, the optical power of the auxiliary light is adjusted so that the output power of the other channels may not change. Therefore, in the Raman optical amplifier of the embodiment, even if the input power of multi-wavelength light changes due to the addition or deletion of a channel, the fluctuations of the output power for each of the other channels can be suppressed to a low level.

Next, the relationship between auxiliary light and the Raman amplifying operation is described.

Figure 7:
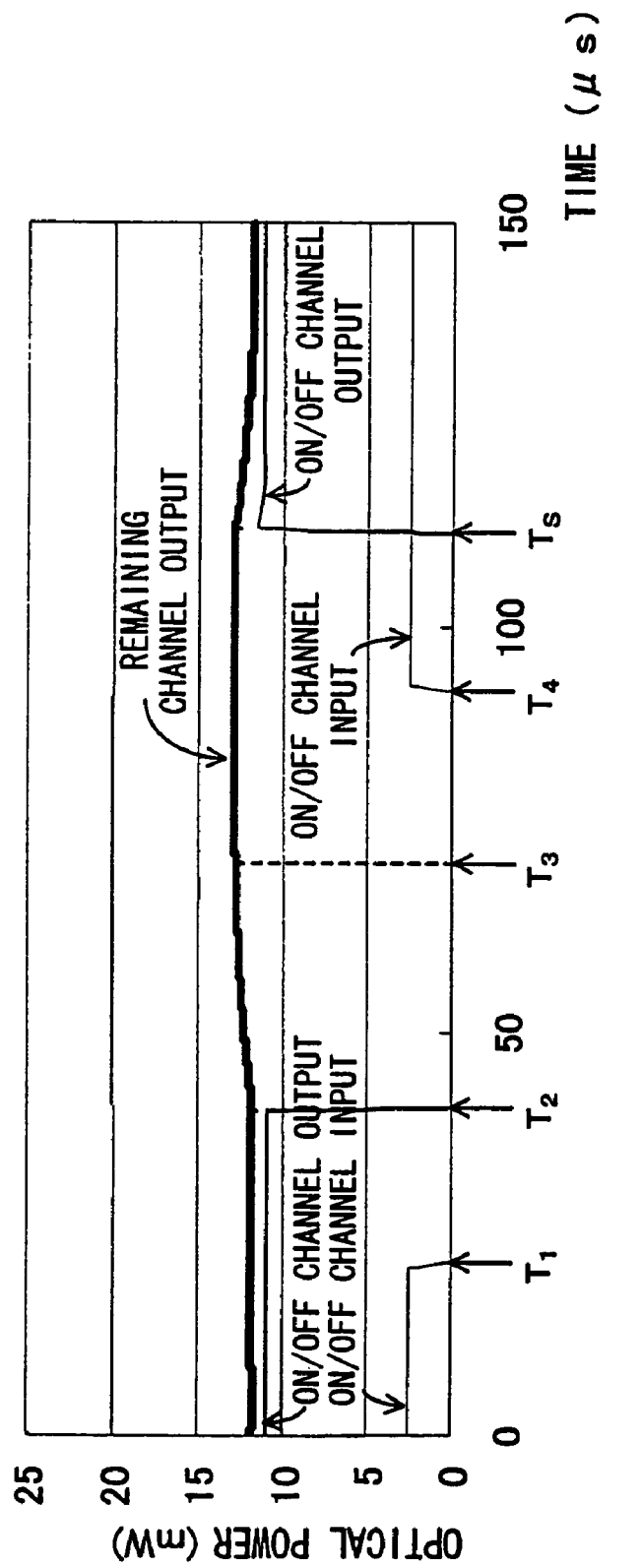
FIG. 7 shows a Raman amplifying operation performed when no auxiliary light is supplied.

FIG. 7 shows the Raman amplifying operation performed when no auxiliary light is supplied. In this case, it is assumed that a backward pumping type Raman optical amplifier is used in a gain-saturated area. It is also assumed that the optical power of pumping light that is generated by the pumping light source 2 is constant. It is also assumed that a prescribed segment of signal light in the plurality of segments of signal light is added or deleted, while the multi-wavelength light including the plurality of segments of signal light with a different wavelength each is amplified. In the following description, signal light to be added/deleted is called an "ON/OFF channel", and the other channels are called "remaining channels".

In the example shown in FIG. 7, the input/output power of the ON/OFF channel and the average output power per channel of the remaining channels are drawn. Although before time T2 and after time T5, the output power of the ON/OFF channel and that of the remaining channels become almost the same, in this drawing, they are separately drawn for easy distinction.

If at time T1, the input of the ON/OFF channel is deleted, at time T2 (after a prescribed time has elapsed), the output of the ON/OFF channel is also deleted. Here, a time period from when the input of the ON/OFF channel is deleted until the output of the ON/OFF channel is deleted (that is to say, between time T1 and time T2) corresponds to the signal propagation time of the Raman amplification fiber 1. This propagation time depends on the length of the Raman amplification fiber 1.

Between time T2 and time T3, the output power of the remaining channels gradually continues to increase. Then, after time T3, the output power of the remaining channels becomes stable. Here, a time period from when the output power of the remaining channels starts to increase until it becomes steady (that is to say, between time T2 and time T3) depends on (for example, is proportional to) the signal propagation time of the Raman amplification fiber 1.

Furthermore, if at time T4, the ON/OFF channel is added, then at time T5, the signal light of the ON/OFF channel is outputted. After time T5, the output power of the remaining channels gradually continues to decrease and after a prescribed time has elapsed, it returns to the state before time T2. In this case, this prescribed time also depends on (for example, is proportional to) the signal propagation time of the Raman amplification fiber 1.

As described above, if the ON/OFF channel is added/deleted while no auxiliary light is supplied, the output power of the remaining channels fluctuates. Specifically, when the input power of multi-wavelength light decreases due to the stop or deletion of the ON/OFF channel, the saturation level of the Raman amplification fiber 1 becomes low and the gain increases. Accordingly, the output power per channel of the remaining channels increases. Conversely, when the input power of multi-wavelength light increases due to the start or addition of the ON/OFF channel, the saturation level of the Raman amplification fiber 1 becomes high and the gain decreases. Accordingly, the output power per channel of the remaining channels decreases.

Therefore, in the Raman optical amplifier of the embodiment, in order to suppress such fluctuations of the remaining channels, auxiliary light is supplied to the Raman amplification fiber 1 and the optical power of the auxiliary light is controlled based on the change of the input power of multi-wavelength light.

Figure 8:
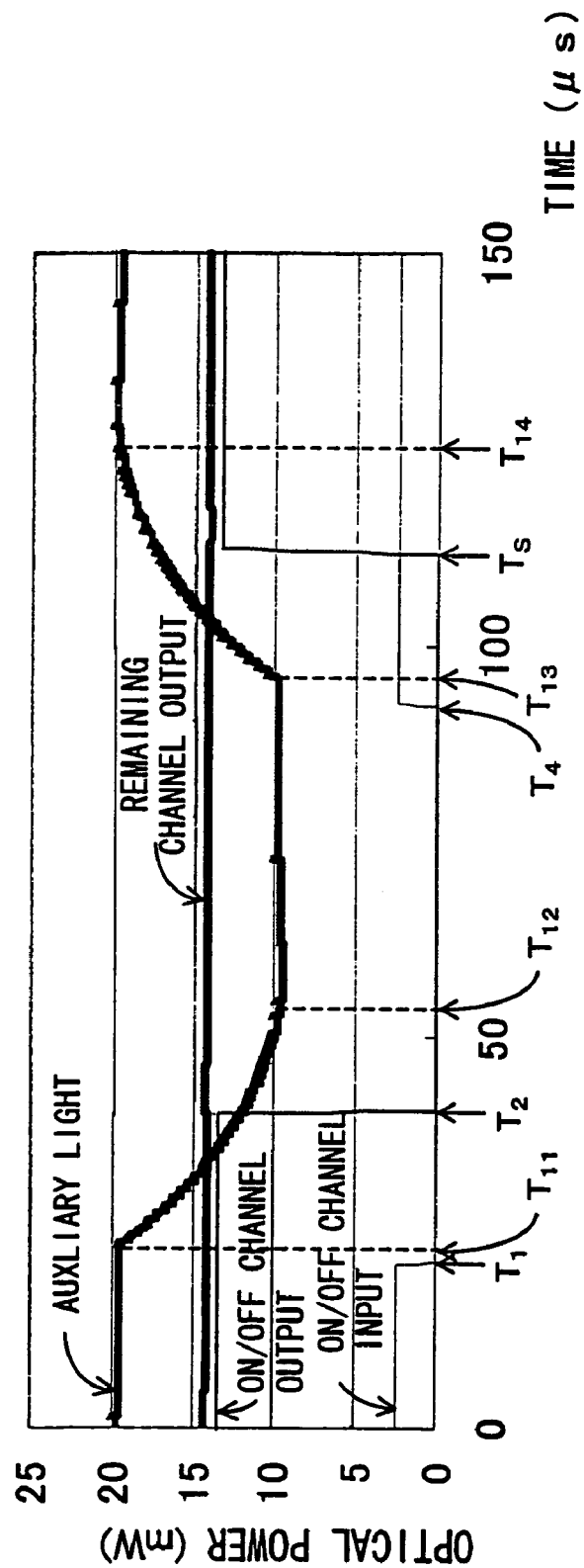
FIG. 8 shows a Raman amplifying operation performed when auxiliary light is supplied.

FIG. 8 shows the Raman amplifying operation performed when auxiliary light is supplied. In this example, the input of an ON/OFF channel is deleted at time T1 and the ON/OFF channel is added at time T4, which is the same as the example shown in FIG. 7.

In this case, if the input of an ON/OFF channel is deleted at time T1, the optical power of auxiliary light is controlled in such a way as to gradually continue to decrease with a prescribed response time. Specifically, the optical power of the auxiliary light gradually continues to decrease between time T11 and time T12. By changing the optical power of the auxiliary light in this way, the fluctuations in output power of the remaining channels is suppressed. That is to say, even if the ON/OFF channel is deleted, the fluctuations in output power of the remaining channels is suppressed to a low level.

Similarly, if the ON/OFF channel is added at time T4, the optical power of the auxiliary light is controlled in such a way as to gradually continue to increase with a prescribed response time. Specifically, the optical power of the auxiliary light gradually continues to increase between time T13 and time T14. By changing the optical power of the auxiliary light in this way, the fluctuations in output power of the remaining channels is suppressed. That is to say, even if the ON/OFF channel is added, the fluctuations in output power of the remaining channels is suppressed to a low level.

The changing pattern (the amount of change and response time) of the auxiliary light for the addition/deletion of the ON/OFF channel is determined in such a way that the fluctuations in output power of the remaining channels may be minimized. Here, this changing pattern is determined by a simulation test or a practical test. Specifically, the response time is determined, for example, according to one of the following rules.

(1) The response time is set to a value proportional to the length of the Raman amplification fiber 1.
(2) The response time is set to a value proportional to (for example, twice as long as) the signal propagation time of the Raman amplification fiber 1.
(3) The response time is set to a value equivalent to time period required for the remaining channels to change from a certain steady state to another steady state when the ON/OFF channel is added/deleted in an environment where no auxiliary light is supplied.
(4) The response time is set to a value such that compensates for the fluctuations of the saturation level in the Raman amplification fiber 1 due to the addition/deletion of the ON/OFF channel.
(5) The response time is set to a value such that compensates for the change of the gain in the Raman amplification fiber 1 due to the addition/deletion of the ON/OFF channel.

As described above, if appropriately controlled auxiliary light is supplied, the fluctuations in output power of the remaining channels can be suppressed to a low level even if an ON/OFF channel is added/deleted in a gain-saturated state. Specifically, when the number of wavelengths of multi-wavelength light decreases due to the deletion or stop of an ON/OFF channel, the saturation level of the Raman amplification fiber 1 can be maintained constant by gradually continuing to decrease the optical power of auxiliary light that works as pumping light. When the number of wavelengths of multi-wavelength light increases due to the addition of an ON/OFF channel, the saturation level of the Raman amplification fiber 1 can be maintained constant by gradually continuing to increase the optical power of auxiliary light that works as pumping light. As a result, even if the number of channels of multi-wavelength light changes, the gain is always maintained constant since the saturation level is always maintained constant. Accordingly, the output power per channel of the remaining channels is also maintained almost constant.

In FIGS. 7 and 8, the cases where an ON/OFF channel is added and deleted in a gain-saturated state are shown, respectively. However, if Raman amplification occurs between signal lights, similarly, the output power of the remaining channels fluctuates due to the addition/deletion of the ON/OFF channel.

Figure 9:
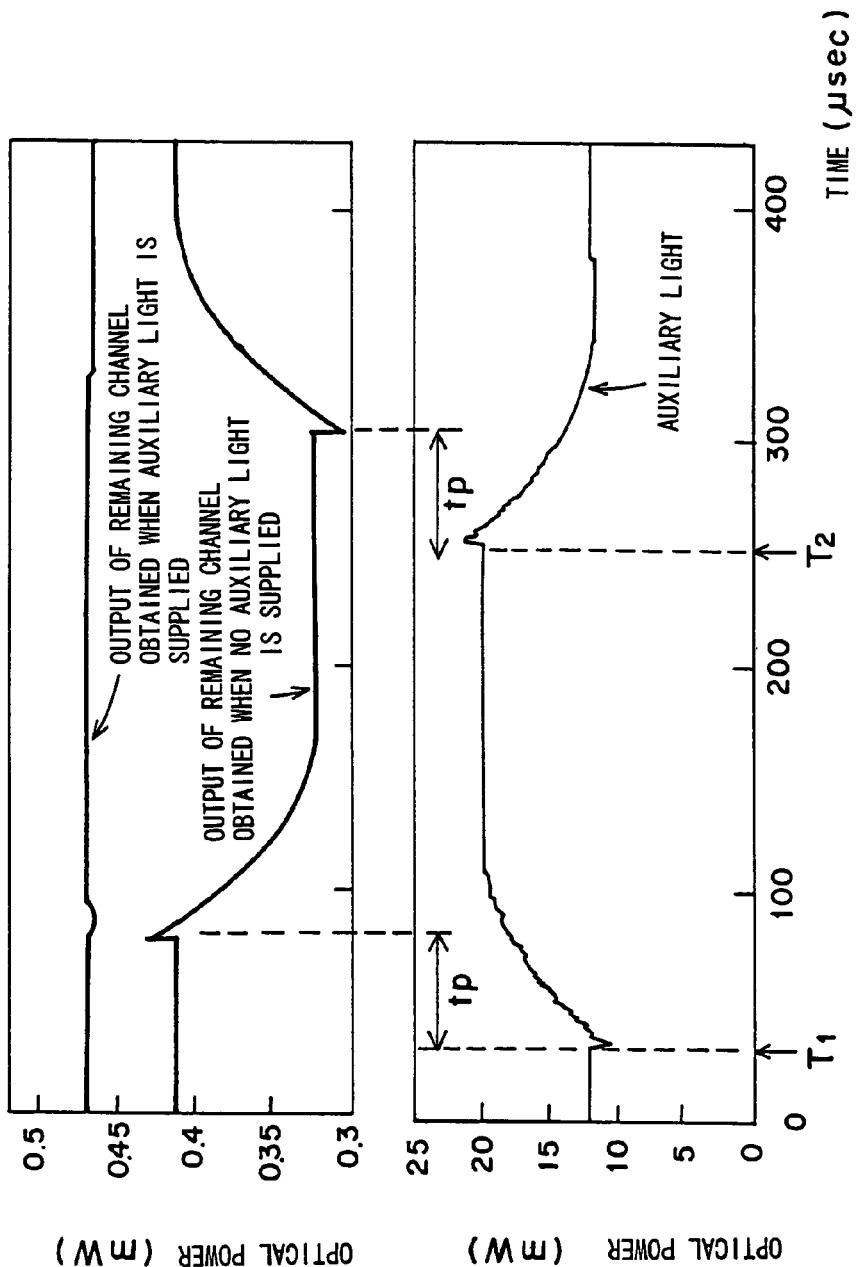
FIG. 9 shows an output characteristic obtained when there is inter-signal light Raman amplification.

FIG. 9 shows the output characteristic of a Raman optical amplifier operated when Raman amplification occurs between signal lights. In the following description, the phenomenon that Raman amplification occurs between signal lights refers to "inter-signal light Raman amplification". Here, "inter-signal light Raman amplification" is a phenomenon in which signal light with a shorter wavelength of multi-wavelength light amplifies other signal light with a longer wavelength.

In FIG. 9, if an ON/OFF channel is deleted or the ON/OFF channel stops at time T1 while no auxiliary light is supplied, an (instantaneously) rapid change occurs in the output power of the remaining channels after time period of Tp has elapsed from that timing, and then the optical power converges with a response time that is approximately twice as long as the time period of Tp. Similarly, if the ON/OFF channel is added at time T2, a rapid change occurs in the optical power of the remaining channels after time period of Tp has elapsed, and then the optical power converges with a response time of approximately twice as long as the time period of Tp. In other words, if no auxiliary light is supplied, the output power of the remaining channels greatly fluctuates.

The auxiliary light described above is also effective in suppressing such fluctuations in output power in the remaining channels. Specifically, when an ON/OFF channel is deleted, the optical power of the auxiliary light is controlled in such a way as to continue to increase with a response time that is approximately twice as long as the time period of Tp. When the ON/OFF channel is added, the optical power of the auxiliary light is controlled in such a way as to continue to decrease with a response time that is approximately twice as long as the time period of Tp. As a result, even if the ON/OFF channel is added/deleted while there is inter-signal light Raman amplification, the output power of the remaining channels hardly fluctuates and the occurrence of a rapid change can also be suppressed.

It is because the auxiliary light is adjusted by feed forward control that the output power of the remaining channels can be suppressed by using the auxiliary light. That is to say, if the auxiliary light is supplied backward to the Raman amplification fiber 1 and is adjusted by feedback control, the optical power of the auxiliary light is adjusted after the change in output power of the remaining channels has been detected. Therefore, the control cannot catch up with the fluctuations of the output power of the remaining channels. However, in feed forward control, auxiliary light is controlled in such a way that the saturation state or gain of the Raman amplification fiber 1 is maintained constant before the output power of the remaining channels changes. Therefore, the fluctuations in output power of the remaining channels is suppressed.

Figure 10:
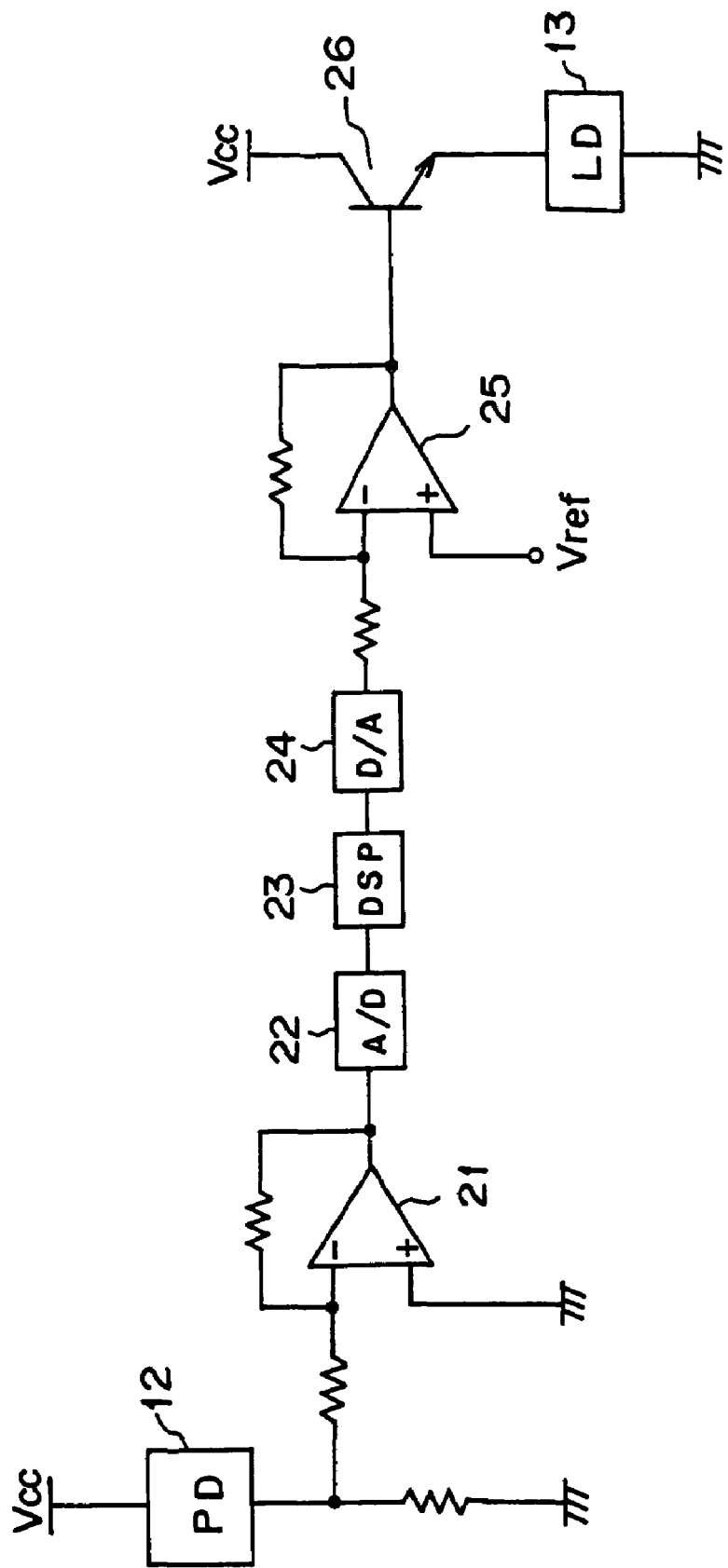
FIG. 10 shows an example of the auxiliary light control circuit shown in FIG. 5.

FIG. 10 shows an example of the auxiliary light control circuit 14 shown in FIG. 5. An operational amplifier 21 amplifies a signal outputted from the photo receiving device (PD) 12. Here, the signal outputted from the photo receiving device 12 indicates the optical power of multi-wavelength light inputted into the Raman optical amplifier. An A/D converter 22 converts the analog signal outputted from the operational amplifier 21 into a digital signal. An operation unit 23, which can be realized by a digital signal processor (DSP) or the like, performs a prescribed operation using the output of the A/D converter 22, and generates a signal to drive the auxiliary light source 13. A D/A converter 24 converts the digital signal outputted from the operation unit 23 into an analog signal. An operational amplifier 25 amplifies the output of the D/A converter 24. A power transistor 26 supplies driving current to the auxiliary light source 13, based on the output of the operational amplifier 25.

In this auxiliary light control circuit 14, the operation unit 23 determines the changing pattern of the optical power of the auxiliary light, based on the variations in optical power of input multi-wavelength light. Here, the changing pattern of the optical power of auxiliary light is indicated, for example, by a "response time", the "level of the auxiliary light before change" and the "level of the auxiliary light after change".

Figure 11:
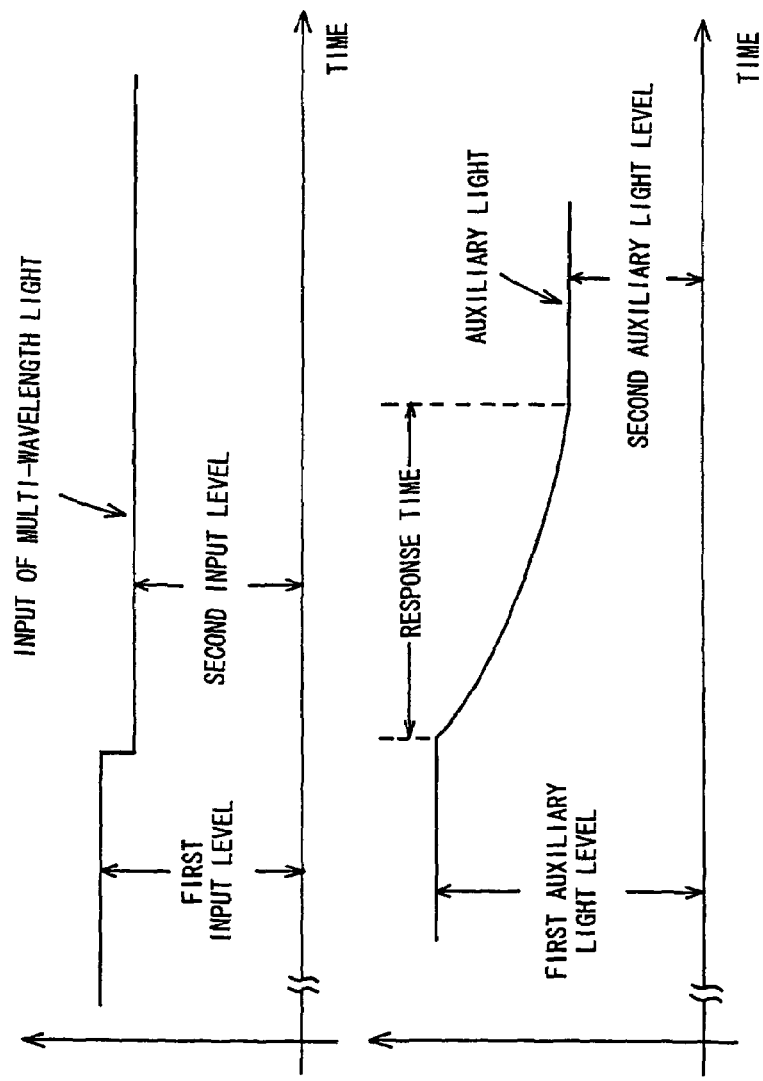
FIG. 11 shows the changing pattern of auxiliary light.

In the example shown in FIG. 11, it is assumed that when the input power of multi-wavelength light is at the first level and second level, the optical level of auxiliary light is set to the first auxiliary light level and the second auxiliary light level, respectively. When the input level of the multi-wavelength light changes from the first level to the second level due to the deletion or stop of a certain signal light in the multi-wavelength light, the auxiliary light is controlled in such a way as to change from the first auxiliary light level to the second auxiliary light level with a prescribed response time. In this case, the optical power and response time of the auxiliary light are determined by the saturation level of gain and the amount of tilt of inter-signal Raman amplification. Here, the saturation level of gain and the amount of inter-signal Raman amplification tilt are determined based on the Raman parameters of the Raman amplification fiber 1, such as a gain coefficient, an effective cross section, a loss coefficient and the like, and the length of the Raman amplification fiber 1. In any case, the changing pattern of the auxiliary light to be used to suppress the fluctuations of the output power due to the change of the input power can be obtained by a simulation test or the like.

Although in the example shown in FIG. 10, the Raman optical amplifier is configured in such a way that the operation unit 23 operates the changing pattern of auxiliary light; the present invention is not limited to this configuration. Alternatively, the Raman optical amplifier can also be configured in such a way that pattern information indicating the changing pattern of the auxiliary light is stored in advance in a table created in prescribed memory area, and when the input power of multi-wavelength light changes, the pattern information is extracted from the table according to the change of the input power and the pattern information is used.

As described above, in the Raman optical amplifier of the embodiment, backward pumping light is supplied to the Raman amplification fiber 1 and auxiliary light is supplied as forward pumping light. When the input power of multi-wavelength light changes from the first input level to the second input level, the optical power of the auxiliary light gradually continues to change from the first steady state corresponding to the first input level to the second steady state corresponding to the second input level with a response time that is approximately twice as long as the propagation time of the Raman amplification fiber 1, so that the fluctuations in output power of each segment of signal light included in the multi-wavelength light can be suppressed. In this way, even if the input power of multi-wavelength light changes, the fluctuations in output power of each segment of signal light included in the multi-wavelength light can be suppressed.

FIG. 12 shows the configuration of the Raman optical amplifier in another embodiment of the present invention. The basic configuration of this Raman optical amplifier is the same as that of the Raman optical amplifier shown in FIG. 5. The Raman optical amplifier shown in FIG. 5 is configured in such a way that the optical power of auxiliary light is controlled based on the change of the input power (total optical power) of multi-wavelength light. However, in this Raman optical amplifier, the optical power of auxiliary light is controlled based on the wavelength of signal light to be added/deleted.

In FIG. 12, the optical coupler 11 splits part of input multi-wavelength light and guides it to an optical spectrum analyzer 31. The optical spectrum analyzer 31 analyzes the spectrum of the multi-wavelength light. Specifically, the optical spectrum analyzer 31 detects the optical power of each segment of signal light included within the multi-wavelength light. Therefore, which channel is added/deleted can be detected by monitoring the output of the optical spectrum analyzer 31.

An auxiliary light control circuit 32 controls the optical power of auxiliary light, based on the wavelength of an added/deleted channel. Here, the operation of the auxiliary light control circuit 32 is basically the same as that of the auxiliary light control circuit 14 shown in FIG. 5. That is to say, when there is a change in the multi-wavelength light, both auxiliary light control circuits change the optical power of the auxiliary light with a response time proportional to the signal propagation time of the Raman amplification fiber 1. However, the auxiliary light control circuit 32 uses a different optical power changing pattern of the auxiliary light depending on the wavelength of a signal light to be added/deleted. The operations of the auxiliary light control circuit 32 are described below with reference to FIGS. 13A through 13C and 14.

Figure 13A:
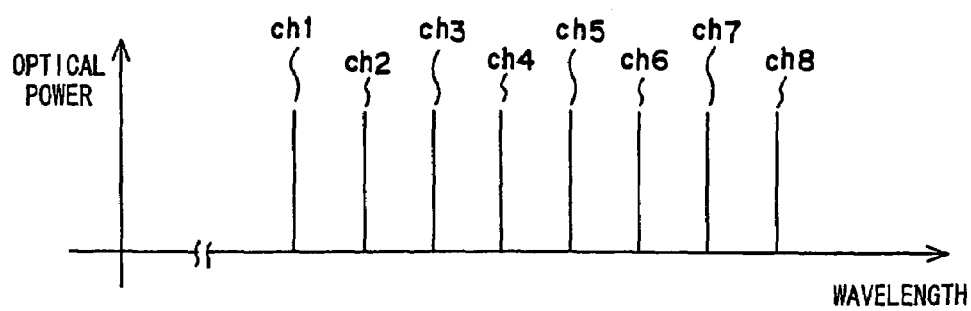
FIGS. 13A through 13C show the states of multi-wavelength light.
Figure 13B:
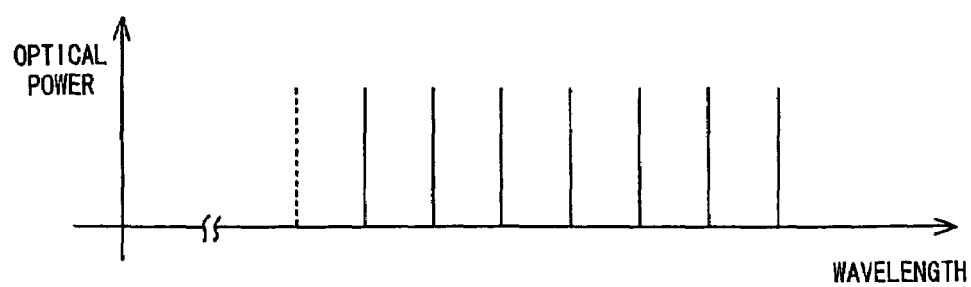
Figure 13C:
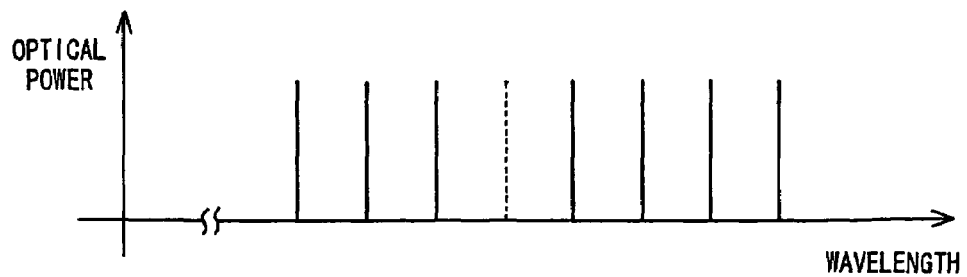

FIGS. 13A through 13C show the states of the multi-wavelength light. In this example, it is assumed that the multi-wavelength light carries eight channels with a different wavelength each. FIGS. 13A, 13B and 13C show the state where all the channels are used, the state where channel 1 is not used and the state where channel 4 is not used, respectively.

FIG. 14 shows an example of the management table that manages the respective optical power values of auxiliary light corresponding to each state of the multi-wavelength light. In FIG. 14, for example, "11111111" and "01111111" indicates the state where "all the channels are used" and the state where "channel 1 is not used", respectively. The optical power value stored in this table is a value which equalizes the output power of each channel of multi-wavelength when the auxiliary light is supplied and is calculated in advance by a simulation test or the like. Alternatively, the level of auxiliary light can also be calculated by the operating process of the control circuit from time to time.

When detecting the state of the multi-wavelength light based on a signal outputted from the optical spectrum analyzer 31, the auxiliary light control circuit 32 refers to the table shown in FIG. 14 and determines the optical power of the auxiliary light. For example, as shown in FIG. 13A, if all the channels are used, the auxiliary light control circuit 32 drives the auxiliary light source 13 in such a way that the optical power of the auxiliary light becomes "A0".

Furthermore, when detecting the change in state of the multi-wavelength light based on a signal outputted from the optical spectrum analyzer 31, the auxiliary light control circuit 32 refers to the table shown in FIG. 14 and determines changing pattern of the optical power of auxiliary light. For example, if channel 1 stops being used in the state shown in FIG. 13A, the auxiliary light control circuit 32 drives the auxiliary light source 13 in such a way as to change the optical power of the auxiliary light from "A0" to "A1". Similarly, if channel 4 stops being used in the state shown in FIG. 13A, the auxiliary light control circuit 32 drives the auxiliary light source 13 in such a way as to change the optical power of the auxiliary light from "A0" to "A4". In this case, both of the response time required for the optical power of auxiliary light to change from "A0" to "A1" and the response time required for it to change from "A0" to "A4" is, for example, approximately twice as long as the propagation time of the Raman amplification fiber 1.

Figure 15:
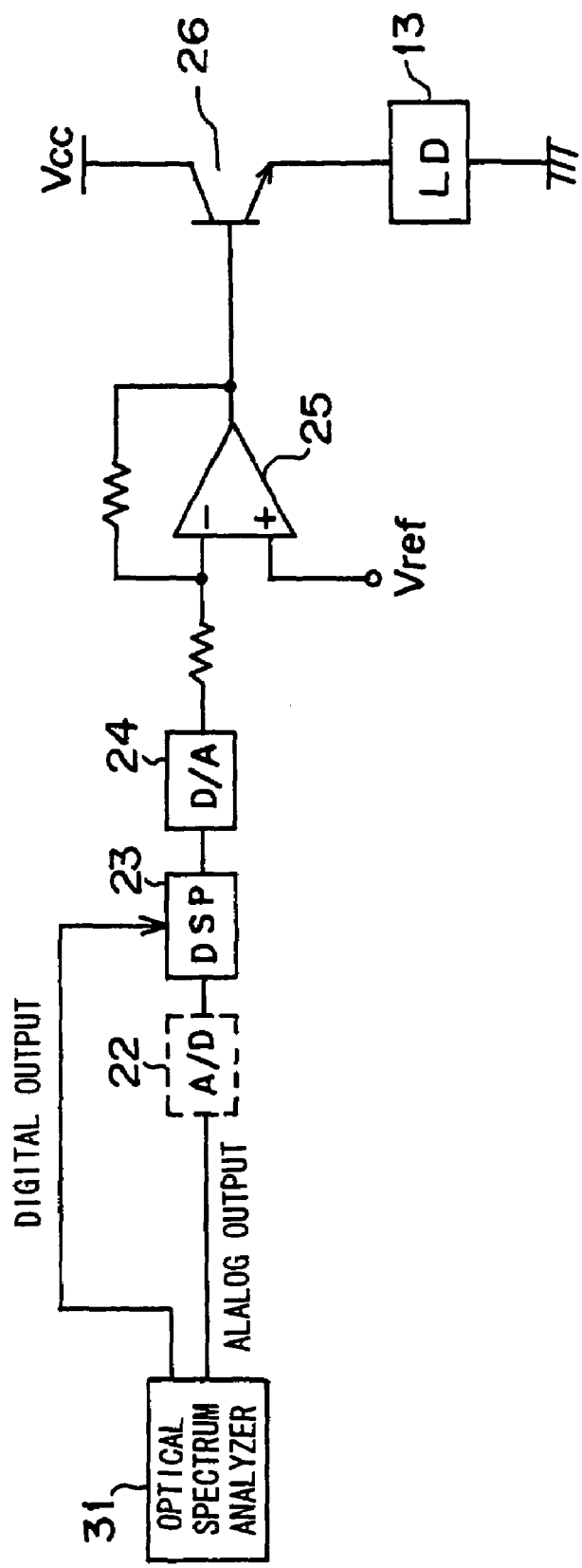
FIG. 15 shows an example configuration of the auxiliary control circuit shown in FIG. 12.

FIG. 15 shows an example of the auxiliary light control circuit 32 shown in FIG. 12. The basic configuration of the auxiliary light control circuit 32 is the same as that of the auxiliary light control circuit 14 shown in FIG. 10. If the output of the optical spectrum analyzer 31 is an analog signal, the output signal of the optical spectrum analyzer 31 is supplied to the operation unit 23 through an A/D converter 22. If the output of the optical spectrum analyzer 31 is a serial (digital) signal, the output signal of the optical spectrum analyzer 31 is directly supplied to the operation unit 23.

Figure 16:
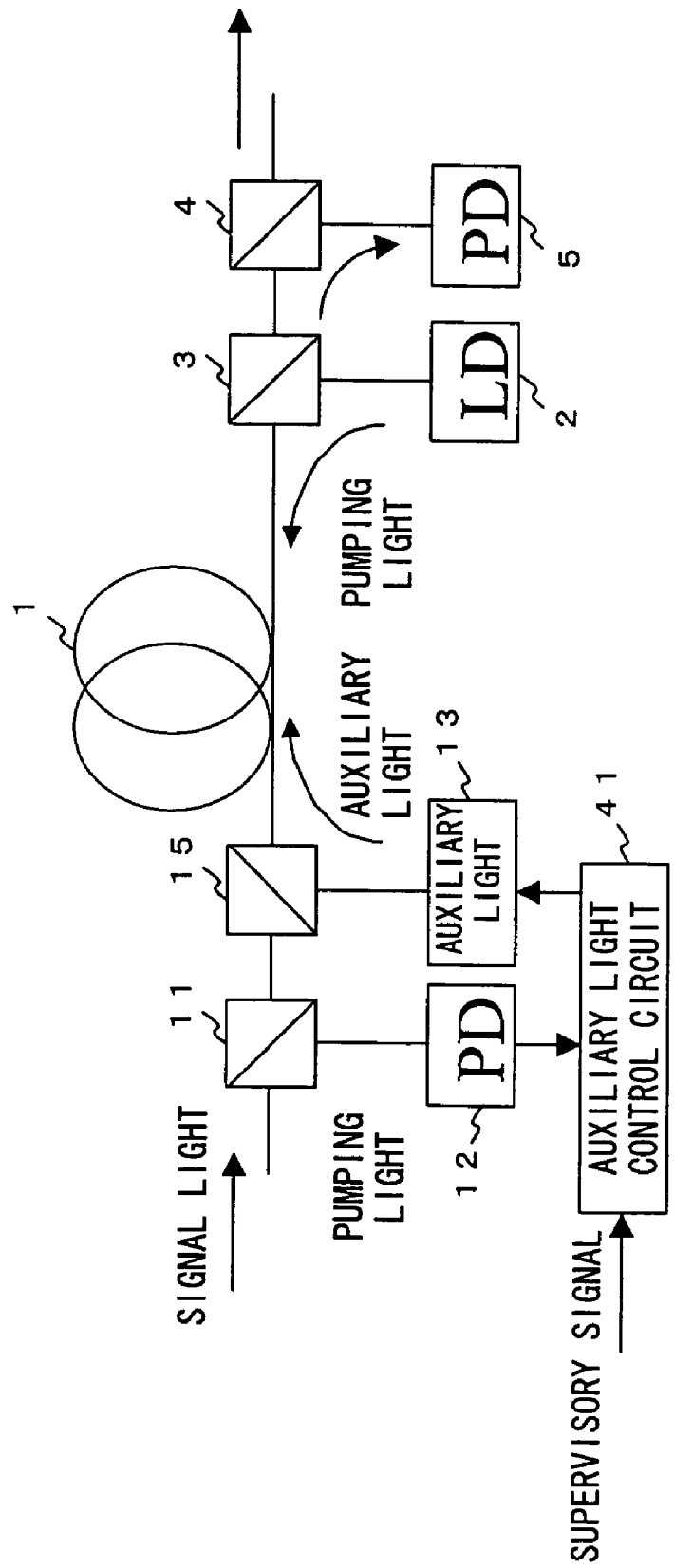
FIG. 16 shows the configuration of the Raman optical amplifier in another embodiment of the present invention.

FIG. 16 shows the configuration of the Raman optical amplifier in another embodiment of the present invention. The basic configuration of this Raman optical amplifier is the same as that of the Raman optical amplifier shown in FIG. 12. In this Raman optical amplifier too, the optical power of auxiliary light is controlled based on the wavelength of signal light to be added/deleted. In the Raman optical amplifier shown in FIG. 12, the wavelength of signal light to be added/deleted is detected by monitoring the state of the multi-wavelength light using an optical spectrum analyzer. However, this Raman optical amplifier receives state information indicating the states of a plurality of segments of signal light included in multi-wavelength light from outside and controls the optical power of the auxiliary light using the state information. This state information is transmitted by a supervisory signal, which is described later.

Figure 17:
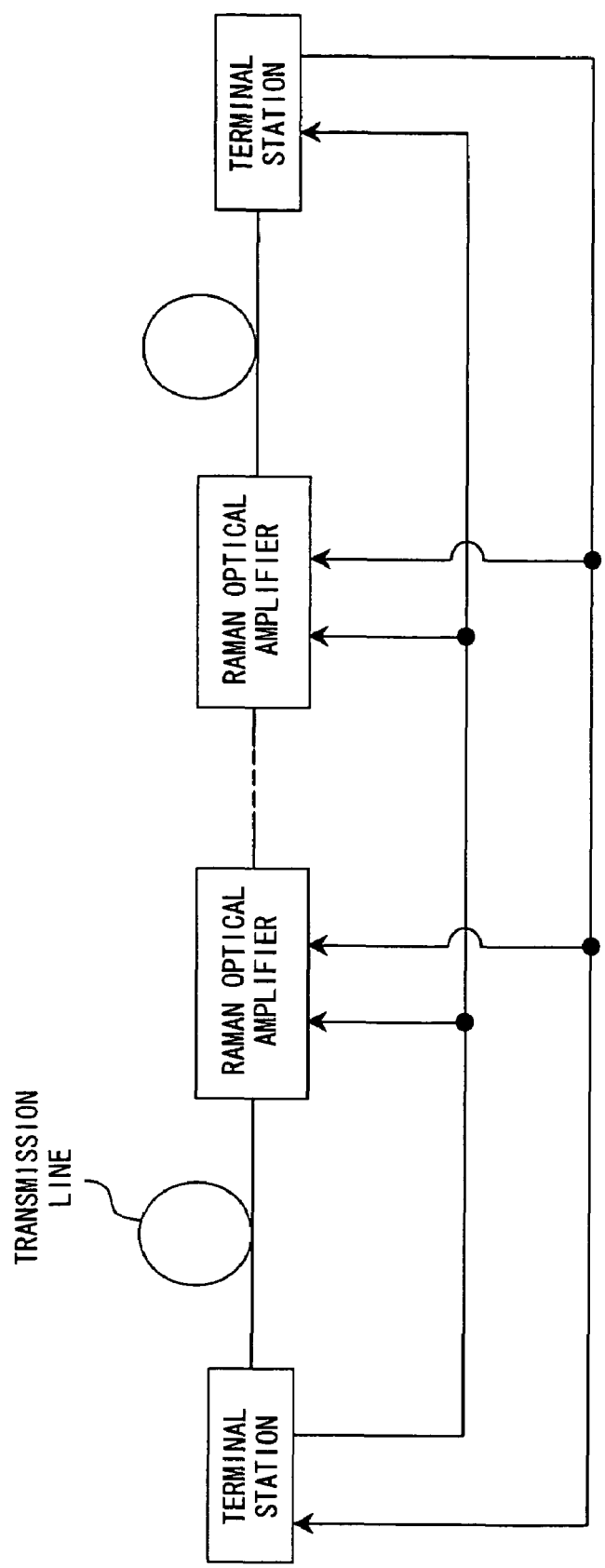
FIG. 17 shows the configuration of a transmission system using the Raman optical amplifier shown in FIG. 16.

An auxiliary light control circuit 41 receives the supervisory signal and controls the optical power of the auxiliary light according to the supervisory signal. This supervisory signal includes information indicating the wavelength of a channel to be added/deleted or information indicating the use/non-use of each channel. For example, as shown in FIG. 17, this supervisory signal is generated in the terminal station of a transmission system, and is notified to each Raman optical amplifier provided on the transmission line. This supervisory signal is notified to each Raman optical amplifier before a channel is actually added/deleted.

The auxiliary light control circuit 41 also monitors the change in input power of the multi-wavelength light similar to the auxiliary light control circuit 14 shown in FIG. 5. Therefore, the auxiliary light control circuit 41 can detect a timing when a channel in the multi-wavelength light is added/deleted. In this case, the auxiliary light control circuit 41 has recognized the wavelength of an added/deleted channel by the supervisory signal received in advance from the terminal station. Therefore, the auxiliary light control circuit 41 can detect the wavelength of the added/deleted channel and the added/deleted timing without an optical spectrum analyzer. In other words, the Raman optical amplifier shown in FIG. 16 can realize substantially the same operation as that of the Raman optical amplifier shown in FIG. 12.

In each of the Raman optical amplifiers shown in FIGS. 5, 12 and 16, it is preferable for auxiliary light to be de-polarized. In that case, if continuous waves with the same wavelength is generated by a plurality of laser light sources and are orthogonally polarization multiplexed, de-polarized auxiliary light is generated. By introducing this configuration, the increase in polarization dependence of signal light gain can be suppressed even if auxiliary light is used.

In a bi-directional pumping type Raman optical amplifier, if forward pumping light is controlled using the auxiliary light control circuit 14 shown in FIG. 5, the auxiliary light control circuit 32 shown in FIG. 12 or the auxiliary light control circuit 41 shown in FIG. 16, the effect of the present invention can be realized without modifying the configuration of the amplifier.

According to the present invention, since in a backward pumping type Raman optical amplifier, auxiliary light is supplied in the same direction as that of the multi-wavelength light to be amplified, and the optical power of the auxiliary light is adjusted in accordance with the change in input power or state of the multi-wavelength light, the fluctuations of the output level of each segment of signal light included in the multi-wavelength can be suppressed, even if the number of wavelengths of the multi-wavelength light changes.

What is claimed is:

1. A Raman optical amplifier that amplifies multi-wavelength light, comprising:
   an optical amplification medium into which the multi-wavelength light is inputted;
   a pumping light source supplying pumping light to said optical amplification medium;
   an auxiliary light source generating auxiliary light with a wavelength shorter than a center wavelength of the multi-wavelength light;
   an optical device guiding the auxiliary light to said optical amplification medium in the same direction as that of the multi-wavelength light; and
   an auxiliary light controller controlling the optical power of the auxiliary light based on the input power of the multi-wavelength light,
   wherein the pumping light and the auxiliary light cause Raman amplification of the multi-wavelength light, and said auxiliary light controller changes the optical power of the auxiliary light with a prescribed response time based on a change in input power of the multi-wavelength light.

2. The Raman optical amplifier according to claim 1, wherein
   the wavelength of the auxiliary light is the same as that of the pumping light.

3. The Raman optical amplifier according to claim 1, wherein
   the pumping light is guided to said optical amplification medium in the opposite direction as that of the multi-wavelength light.

4. The Raman optical amplifier according to claim 1, wherein
   when the input power of the multi-wavelength light changes, said auxiliary light controller changes the optical power of the auxiliary light based on the change of the multi-wavelength light in such a way as to suppress the fluctuations in output power of the multi-wavelength light outputted from said optical amplification medium.

5. The Raman optical amplifier according to claim 1, wherein
   if the input power of the multi-wavelength light changes from a first input level to a second input level, said auxiliary light controller changes the optical power of the auxiliary light from a first steady state corresponding to the first input level to a second steady state corresponding to the second input level with a response time determined by the propagation time of the multi-wavelength light or the pumping light in said optical amplification medium.

6. The Raman optical amplifier according to claim 5, wherein
   the response time is proportional to the propagation time of the multi-wavelength light or the pumping light in said optical amplification medium.

7. The Raman optical amplifier according to claim 1, wherein
   if the input power of the multi-wavelength light changes from a first input level to a second input level, said auxiliary light controller changes the optical power of the auxiliary light from a first steady state corresponding to the first input level to a second steady state corresponding to the second input level with a response time determined by the length of said optical amplification medium.

8. The Raman optical amplifier according claim 1, wherein
the change in input power of the multi-wavelength light is due to the change in the number of wavelengths of the multi-wavelength light.

9. The Raman optical amplifier according to claim 1, wherein
if the input power of the multi-wavelength light changes, said auxiliary light controller changes the optical power of the auxiliary light taking an influence by stimulated Raman scattering between a plurality of segments of signal light included in the multi-wavelength light into consideration.

10. The Raman optical amplifier according to claim 1, wherein
said auxiliary light controller further comprises:
a storage unit storing pattern information indicating a changing pattern of the optical power of the auxiliary light using information indicating the change in input power of the multi-wavelength light as a retrieval key; and
a drive control unit extracting corresponding pattern information from said storage unit based on a detected change in input power of the multi-wavelength light, and driving said auxiliary light source based on the pattern information.

11. A Raman optical amplifier that amplifies multi-wavelength light, comprising:
an optical amplification medium into which the multi-wavelength light is inputted;
a pumping light source supplying pumping light to said optical amplification medium;
an auxiliary light source generating auxiliary light with a wavelength shorter than a center wavelength of the multi-wavelength light;
an optical device guiding the auxiliary light to said optical amplification medium in the same direction as that of the multi-wavelength light;
a detector detecting the wavelength arrangement of a plurality of segments of signal light included in the multi-wavelength light; and
an auxiliary light controller controlling the optical power of the auxiliary light based on the change of the wavelength arrangement of the plurality of segments of signal light detected by said detector,
wherein the pumping light and the auxiliary light cause Raman amplification of the multi-wavelength light.

12. The Raman optical amplifier according to claim 1, wherein
relative intensity noise of the auxiliary light is set to an amount such that a noise characteristic of the multi-wavelength light outputted from said optical amplification medium is not affected.

13. The Raman optical amplifier according to claim 12, wherein
the relative intensity noise of the auxiliary light is −130 dB/Hz or less.

14. The Raman optical amplifier according to claim 1, further comprising
de-polarization means for de-polarizing the auxiliary light.

15. A Raman optical amplifier that amplifies multi-wavelength light, comprising:
an optical amplification medium into which the multi-wavelength light is inputted;
a forward pumping light source supplying forward pumping light to said optical amplification medium;
a backward pumping light source supplying backward pumping light to said optical amplification medium; and
a controller controlling the optical power of the forward pumping light based on the input power of the multi-wavelength light,
wherein the forward pumping light and the backward pumping light cause Raman amplification of the multi-wavelength light, and said controller changes the optical power of the forward pumping light with a prescribed response time based on a change in input power of the multi-wavelength light.

16. A Raman optical amplifier that amplifies multi-wavelength light, comprising:
an optical amplification medium into which the multi-wavelength light is inputted;
a pumping light source supplying pumping light to said optical amplification medium;
an auxiliary light source generating auxiliary light with a wavelength shorter than a center wavelength of the multi-wavelength light;
an optical device guiding the auxiliary light to said optical amplification medium in the same direction as that of the multi-wavelength light; and
an auxiliary light controller controlling the optical power of the auxiliary light based on the input power of the multi-wavelength light, wherein
the pumping light and the auxiliary light cause Raman amplification of the multi-wavelength light, and,
if the input power of the multi-wavelength light changes from a first input level to a second input level, said auxiliary light controller changes the optical power of the auxiliary light from a first steady state corresponding to the first input level to a second steady state corresponding to the second input level with a response time determined by the propagation time of the multi-wavelength light or the pumping light in said optical amplification medium.

17. The Raman optical amplifier according to claim 16, wherein
the response time is proportional to the propagation time of the multi-wavelength light or the pumping light in said optical amplification medium.

18. A Raman optical amplifier that amplifies multi-wavelength light, comprising:
an optical amplification medium into which the multi-wavelength light is inputted;
a pumping light source supplying pumping light to said optical amplification medium;
an auxiliary light source generating auxiliary light with a wavelength shorter than a center wavelength of the multi-wavelength light;
an optical device guiding the auxiliary light to said optical amplification medium in the same direction as that of the multi-wavelength light; and
an auxiliary light controller controlling the optical power of the auxiliary light based on the input power of the multi-wavelength light, wherein
the pumping light and the auxiliary light cause Raman amplification of the multi-wavelength light, and, if the input power of the multi-wavelength light changes from a first input level to a second input level, said auxiliary light controller changes the optical power of the auxiliary light from a first steady state corresponding to the first input level to a second steady state corresponding to the second input level with a response time determined by the length of said optical amplification medium.

19. An apparatus comprising:

an optical amplification medium through which a multi-wavelength light, an auxiliary light and a pump light travel, wherein the auxiliary light has a wavelength shorter than a center wavelength of the multi-wavelength light, the multi-wavelength light and the auxiliary light both travel through the optical amplification medium in the same direction, and the pump light and the auxiliary light cause Raman amplification of the multi-wavelength light to occur in the optical amplification medium as the multi-wavelength light travels through the optical amplification medium; and means for changing an optical power of the auxiliary light with a prescribed response time based on a change in the input power of the multi-wavelength light.

* * * * *

UNITED STATES PATENT AND TRADEMARK OFFICE
CERTIFICATE OF CORRECTION

| | | |
|---|---|---|
| PATENT NO. | : 7,180,654 B2 | Page 1 of 1 |
| APPLICATION NO. | : 10/622580 | |
| DATED | : February 20, 2007 | |
| INVENTOR(S) | : Yasushi Sugaya et al. | |

It is certified that error appears in the above-identified patent and that said Letters Patent is hereby corrected as shown below:

Column 15, Line 4, after "according" insert --to--.

Signed and Sealed this

Nineteenth Day of June, 2007

JON W. DUDAS
*Director of the United States Patent and Trademark Office*